HAFELFINGER & EAGLE.
Corn Husker, Sheller and Stripper.
No. 84,419.
Patented Nov. 24, 1868.
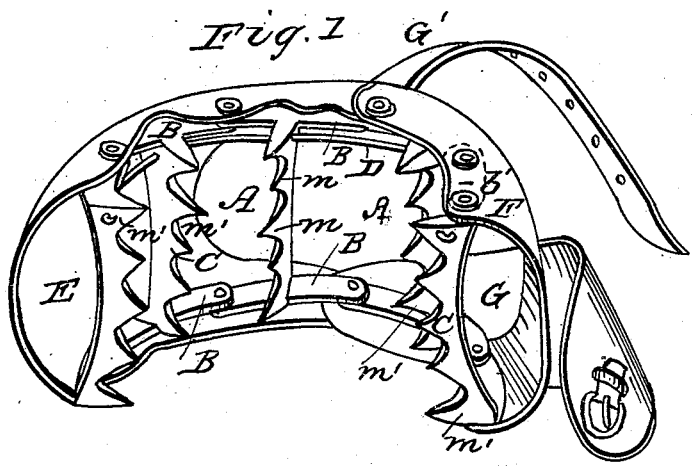
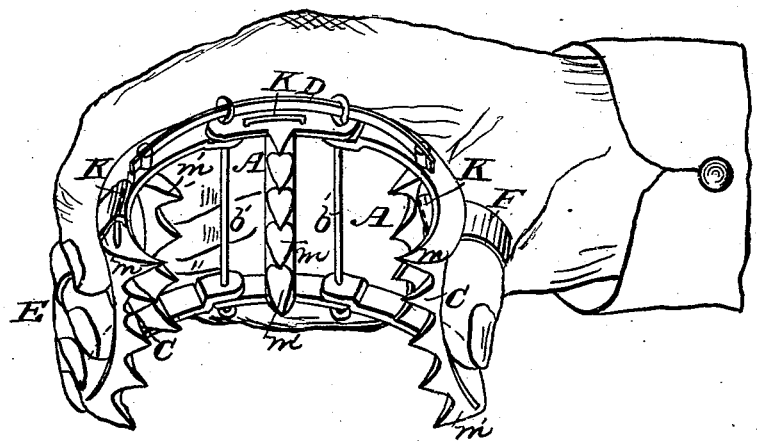
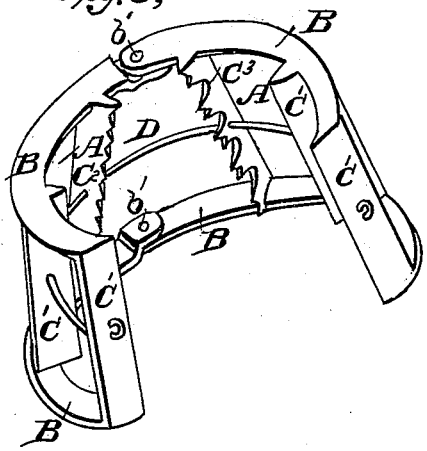
WITNESSES
INVENTOR
Hafelfinger and Eagle

United States Patent Office.

FRIEDRICH HÄFELFINGER AND ROBERT N. EAGLE, OF WASHINGTON, DISTRICT OF COLUMBIA.

*Letters Patent No. 84,419, dated November 24, 1868.*

IMPROVEMENT IN CORN-HUSKER, SHELLER, AND STRIPPER.

The Schedule referred to in these Letters Patent and making part of the same.

*To all whom it may concern:*

Be it known that we, FRIEDRICH HÄFELFINGER and ROBERT N. EAGLE, both of the city and county of Washington, District of Columbia, have invented a new and useful Improved Corn-Husker, Sheller, and Stripper; and we do hereby declare the following to be a full, clear, and exact description thereof, reference being had to the accompanying drawing, which is made a part of this specification.

The object of this invention is to provide a convenient tool for shelling corn from the cob, removing the husk from the ear, and stripping off the leaves or fodder from the stalk.

The two consist of two or more sections, each of which has side bars and transverse serrated bars, the sections being so constructed and arranged as to assume a frusto-conical or other curved form when the hand of the operator is closed, the connections allowing the sections to swing or work loosely upon each other, in order that the spring may act freely.

For retention of the tool, and to assist the hand when closed to clutch and abrade the ear, as chiefly needful in steady work, thumb-and-finger holders, and a leather back-band may be provided.

The tool may be used in pairs, one by each hand, and simultaneously brought into operation upon the ear, or one tool used as a holder, while the other strips the cob of its grain.

The tool is contracted to the required circle of the ear by the hand, and expansion for liberating the cob may be assisted by a spring.

Figure 1 shows a complete device, with finger-holders and leather back-strap, attached by the sectional connections, the number of sections being five, (5,) and the number of teeth in a section and transverse bar the same. The length of the teeth varies, the longest running in a diagonal direction across the tool. The spring-device is shown in this figure as passing through each of the transverse bars on the thumb-side of the tool.

Figure 2 shows a modification in three sections, hinged together by simple wires, the number of teeth in the transverse bars alternating four and five, respectively, the longest teeth standing in a line diagonally across the sections, and also upon the outer ends of the bars. The spring is arranged upon the side bars, and loops are cast upon the bars of the end and middle side sections, to afford means for attaching finger-holders and back-straps of any convenient material.

Figure 3 shows another modification, in two sections, whose transverse bars are armed with serrations of various conformations, alternating with plain knife-edged abraders, which run obliquely to the side bars, and thus adapt the tool for stripping off the leaves from standing corn, and, by assistance of the teeth, to remove a row here and there from the ear, or loosen the grain, whereby the operation of shelling by the same tool may be performed. In this figure the spring passes through the centre of the tool.

A A, &c., are sections, consisting of segmental bars B and cross-bars C; these latter being furnished with teeth or blades $m$, presented inward, which serve to hold, abrade, or dislodge any article upon which they are compressed, $m'$ representing the longer or more prominent teeth, hereinafter referred to.

The cross-bars C may be arranged either at right angles or obliquely to the bars B.

The segmental bars B may have perforations $b$ at their ends, (see fig. 3,) through which pass the pins or rivets $b'$, for coupling or hinging the sections A A, &c., together, as well as to secure the several parts of the hood to the tool, when the latter is furnished with a hood.

The springs D, which may be of any suitable material, such as wood, whalebone, rubber, &c., properly applied, tend to expand the tool when relieved from the grasp of the hand, one or more being used, as desired, placed at such points as will be found most effective without interfering with the hand.

The hood, which consists of holders or loops, E F, for the fingers and thumb, respectively, and straps G G', passing from the under side to and joining over the back of the hand, may be altogether dispensed with, and the tool merely held in the hand during use.

The teeth $m$ may be of any desired shape or inclination from their base up, or their points may vary in direction with the lower part or body of the same, or be of different lengths or prominences, one with the other, according to circumstances. We prefer to dispose them so that a series of longer teeth, on the different bars, shall stand in the course of a spiral line to effect an opening in the ear, by forcing out a grain here and there, to facilitate the removal of the remainder; while, for other uses, we prefer the bladed, $C^1$, or shallow serrated transverse bars, $C^2$ and $C^3$, to the toothed bars, shown in figs. 1 and 2.

For old and hard-dried or closely-grained ears, the teeth may be of greater length and sharpness, while for loose-grained or green corn, the serrations will vary in shallowness, or be dispensed with altogether, and substituted by the transverse blade-bars $C^1$, fig. 3.

The thumb-and-finger guards, and apron already referred to as composing the hood, prevent the tool slipping from the hand, afford a more efficient bearing or leverage, and may also serve as a protection to the hand.

The loops K, fig. 2, affording facility for attachment of the finger-holders and back-straps, may or may not be applied, as found most desirable by experience.

The transverse bars, being concave at the back, form a bed or convenient hollow for the fingers, which are thus assisted in keeping their hold upon the tool when used without bands or hood.

The convexity of the working-faces of the said bars C allows of the tool being shifted or rocked over the ear, or its rows from side to side, or circumferentially, as required, and prevents the end teeth from taking too deep a hold.

As the tool is of less width than the hand, we prefer to so construct it that when closed its lower edge will form an arc of larger radius than the upper edge. It is thus adapted to conform more freely to the natural shape of the hand, and take a firmer bearing in the palm of the user.

Having thus described our invention, the following is what we claim as new, and desire to secure by Letters Patent:

1. We claim the sectional bars B B, connected by transverse bars C C, substantially as and for the purposes set forth.

2. In combination with the aforesaid bars B B and C C, we further claim the spring D, for the purpose stated.

3. We further claim the hood E F G G', in combination with the sectional frame B B, C C, substantially as set forth.

4. We claim the loops K, for the attachment of the straps or bands, of any suitable form.

FRIEDRICH HÄFELFINGER.
R. N. EAGLE.

Witnesses:
G. C. WALKER,
BARNARD T. SCHEITLIN.